US006958314B2

(12) United States Patent
McCall

(10) Patent No.: US 6,958,314 B2
(45) Date of Patent: Oct. 25, 2005

(54) ALKYLATED ALKYL POLYGLUCOSIDE NON-IONIC SURFACTANTS

(75) Inventor: David B. McCall, Detroit, MI (US)

(73) Assignee: Master Chemical Corporation, Perrysburg, OH (US)

(*) Notice: Subject to any disclaimer, the term of this patent is extended or adjusted under 35 U.S.C. 154(b) by 169 days.

(21) Appl. No.: 10/379,927

(22) Filed: Mar. 5, 2003

(65) Prior Publication Data

US 2004/0254084 A1 Dec. 16, 2004

Related U.S. Application Data

(60) Provisional application No. 60/362,289, filed on Mar. 7, 2002.

(51) Int. Cl.[7] .............................. C11D 1/66; C11D 3/22; C07G 3/00

(52) U.S. Cl. ........................ 510/470; 510/471; 510/473; 510/474; 510/475; 510/535; 536/4.1; 536/18.3; 536/18.5; 536/43; 536/50; 536/84

(58) Field of Search .................................. 510/470, 471, 510/473, 474, 475, 535; 536/4.1, 18.3, 18.5, 43, 50, 84

(56) References Cited

U.S. PATENT DOCUMENTS

| | | | | | |
|---|---|---|---|---|---|
| 5,006,170 | A | * | 4/1991 | Schwarz et al. | 106/31.3 |
| 5,432,269 | A | * | 7/1995 | Borsotti et al. | 536/18.6 |
| 5,773,595 | A | * | 6/1998 | Weuthen et al. | 536/17.9 |

* cited by examiner

*Primary Examiner*—Brian P. Mruk
(74) *Attorney, Agent, or Firm*—The Weintraub Group P.L.C.

(57) ABSTRACT

A petro-chemical free nonionic surfactant is prepared by the alkylation of an alkyl polyglucoside (APG). Under suitable alkylation reaction conditions, the surfactants are preferably prepared by the reaction of an APG with either alkyl halide or an alkyl tosylate. These surfactants are low foaming and exhibit excellent detergency.

7 Claims, 1 Drawing Sheet

ALKYLATED ALKYL POLYGLUCOSIDE NON-IONIC SURFACTANTS

CROSS-REFERENCE TO RELATED APPLICATIONS

This application is a completion application of co-pending U.S. Provisional Patent Application No. 60/362,289, filed Mar. 7, 2002, for "Alkylated Akyl Polyglucoside Non-Ionic Surfactants," the disclosure of which is hereby incorporated by reference.

BACKGROUND OF THE INVENTION

1. Field of the Invention

The present invention pertains to nonionic surfactants. More particularly, the present invention pertains to petrochemical-free nonionic surfactants. Even more particularly, the present invention pertains to nonionic surfactants derived from alkyl polyglucosides.

2. Prior Art

As is known to those skilled in the art to which the present invention pertains, a vast array of industrial chemicals are oil- or petrochemical-derived. One of the most important classes of such petrochemical-derived chemicals are surfactants or surface active agents and, especially, nonionic surfactants. There are an almost infinite number of nonionic surfactants available in the marketplace with varying properties ranging from low to high HLB, foamers, non-foamers, defoamers, wetting agents, emulsifiers, detergents and the like. The nonionic surfactants, have their properties tailored by virtue of both the hydrophile and hydrophobe as well as the hydrophobe-hydrophile balance imparted thereto during the synthesis thereof. By tailoring not only the hydrophile and the hydrophobe, per se, but the hydrophile-hydrophobe balance, the inherent properties of the resulting chemical can be prescribed to meet the exigencies of the situation and the desired result.

Ordinarily, the hydrophobe or water-insoluble portion of the surfactant is derived from two main sources. Traditionally, the aromatic hydrophobes, such as the alkylphenol and the diphenylethers which are petrochemical-derived comprise the first class of hydrophobes.

The second source or class of hydrophobes is the "naturally occurring" hydrophobe. These comprise a fatty alkyl chain. Traditionally, fatty acids and their derivatives, such as fatty alcohols, fatty amides and fatty amines, which are "naturally occurring," ordinarily define the second group. Concededly, some fatty alkyl hydrophobic compounds are petrochemical-derived, such as the oxo-alcohols, but the vast majority are naturally occurring.

There is known at least one natural terpene-derived hydrophobe but which has been propoxylated to increase hydrophobicity, thereby negating the "naturally occurring" nature of such a surfactant.

It is also theorized that a Guerbet alcohol may define a potential source of hydrophobe which can be naturally occurring or which can be petrochemical-derived. Examples of Guerbet alcohols include, for example, those derived from short chain mono-alcohols, i.e. $C_6$ to $C_{10}$ alcohols.

The other component of a nonionic surfactant is the hydrophile. The most common hydrophile for a nonionic surfactant is obtained by a polymerization addition of an alkylene oxide, such as, for example, ethylene oxide and/or propylene oxide or other lower alkylene oxide to the hydrophobe. The oxide addition is either random or sequential. In any event, though, all alkylene oxides are petrochemical-derived.

In seeking alternate natural sources of hydrophilicity, the art has reported two significant examples thereof. First, there are the glucosamides. These are well known and used regularly in hand dish detergents. Similarly, the gluconic acid-derived surfactants, such as the glucamates which are commercially available from, example, Amerchol, are widely known. In either event, the glucosamides and the gluconic acid-derived surfactants have as their starting material basic naturally occurring sugars, i.e., glucose.

There is presently known and commercially available certain sugar-derived (glucose and sucrose) surfactants having a $C_{8-16}$ fatty alcohol hydrophobe and a glucose hydrophile. These compounds are known as alkyl polyglucosides (APGs). They are well-known and commercially available from a variety of sources including Cognis, Akzo Nobel, and Uniqema.

APGs can be represented by the following formula:

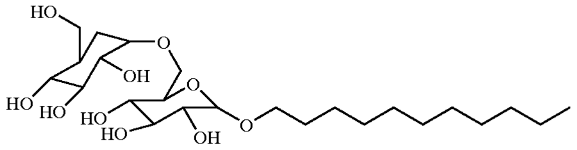

The APGs are petrochemical-free. They provide excellent detergency and are excellent foamers. However, because of the structure of the hydrophile, their hydrophilicity cannot be readily controlled.

Hydrophilicity is created by the addition of oxygen atoms to the hydrophobe. With APGs, oxygen atoms are added as hydroxyl groups, i.e. —OH. Thus, each glucose unit added to the alkyl portion of the surfactant adds three to four hydroxyl groups and the attendant increase in hydrophilicity. This is to be contrasted with typical ethoxylated surfactants where hydrophilicity is generated by adding single oxygen atoms as ether groups which are added individually to the polymer, thus, enabling control of the degree of hydrophilicity. It is to be appreciated that if it were possible to control the hydrophilicity of an APG-based surfactant that a major advance would be provided and it is to this to which the present invention is directed.

SUMMARY OF THE INVENTION

In accordance with the present invention there is provided a nonionic surfactant corresponding to the formula:

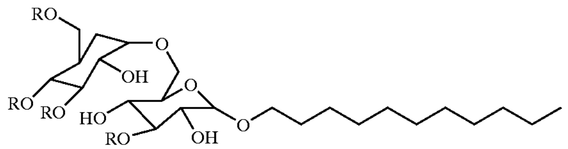

wherein R is lower alkyl ranging from about $C_1$ to $C_8$ and, preferably, $C_1$ to $C_4$.

The nonionic surfactants in accordance herewith have reduced hydrophilicity and, therefore, define low foam nonionic surfactants.

The present surfactants are prepared by the alkylation of some or all of the hydroxyl groups of the glucoside radicals of the APG.

The alkylation reaction is carried out under suitable alkylation conditions, i.e. under suitable substitution reaction conditions. Generally, such reaction is carried out at atmospheric pressure in the presence of a base catalyst and at a temperature of about 0° C. to about 50° C. A suitable reactant or alkylating agent include, for example, an alkyl halide, an alkyl sulfate or an alkyl tosylate, or other aryl sulfonate.

Suitable catalysts include, for example, alkali metal hydroxides, such as, sodium hydroxide, alkali metal carbonates, e.g. sodium carbonate, alkali metal bicarbonates, such as sodium bicarbonate, and the like, as well as mixtures thereof.

Suitable alkyl halides include, for example, methyl iodide, ethyl iodide, propyl iodide, butyl iodide and the like as well as mixtures thereof.

Useful sulfate and tosylate (p-toluenesulfonate) or other aryl sulfonate include the alkyl forms thereof, etc.

For a more complete understanding of the present invention references made to the following detailed description and accompanying drawing.

DESCRIPTION OF THE PREFERRED EMBODIMENT

Figure 1:
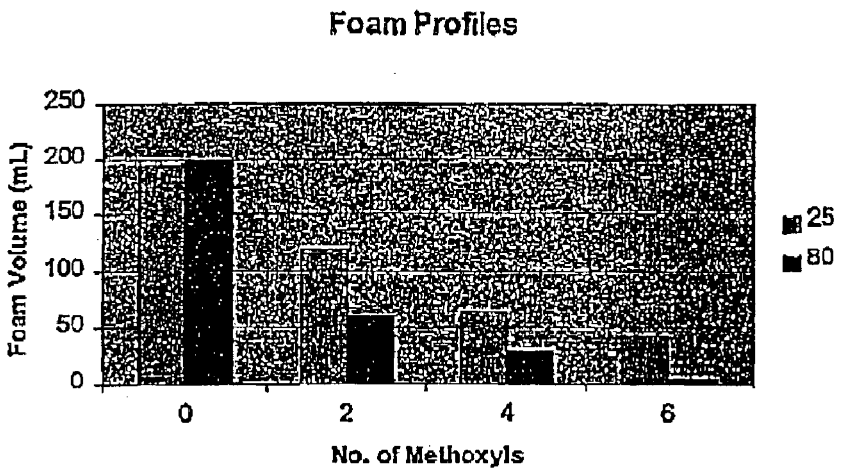
FIG. 1 is a graph showing a foam profile of a surfactant in accordance with the present invention.

As hereinabove noted, and in accordance herewith, there is provided a nonionic surfactant corresponding to the formula:

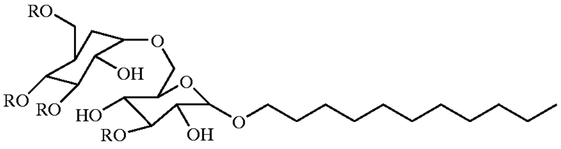

wherein R is lower alkyl ranging from about $C_1$ to $C_8$ and, preferably, $C_1$ to $C_4$.

The nonionic surfactants in accordance herewith have reduced hydrophilicity and, therefore, define low foam nonionic surfactants.

The present surfactants are prepared by the alkylation of some or all of the hydroxyl groups of the glucoside radicals of an alkyl polyglucoside (APG).

The alkylation reaction is carried out under suitable substitution reaction conditions. Generally, such reaction is carried out at atmospheric pressure in the presence of a base catalyst in the presence of an alkyl halide, an alkyl sulfate or an alkyl tosylate and at a temperature of about 0° C. to about 50° C. Suitable catalysts include, for example, alkali metal hydroxides, such as, sodium hydroxide, alkali metal carbonates, e.g. sodium carbonate, alkali metal bicarbonates, such as sodium bicarbonate, and the like, as well as mixtures thereof.

Suitable alkyl halides include, for example, methyl iodide, methyl chloride, ethyl iodide, propyl iodide, butyl iodide and the like well as mixtures thereof. Suitable sulfates and tosylates (p-toluenesulfonate) and other aryl sulfonates include the alkyl derivatives thereof, such as, for example, dimethyl sulfate, methyl tosylate, ethyl tosylate, etc., benzyl tosylate and the like as well as mixtures thereof.

In preparing the nonionic surfactants hereof an alkyl polyglucoside corresponding to the structure noted above is employed as the starting reactant.

Generally, where the halide is used, the reaction can be illustrated as follows:

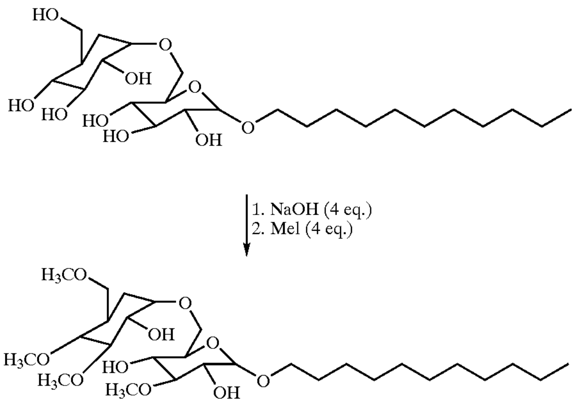

As shown, in carrying out the reaction, it is generally, accomplished by proton removal with the oxyalkylation catalyst followed by classic SN2 substitution. Here it is shown with an alkyl halide, although the reaction may proceed with an alkyl sulfate, tosylate, or other aryl sulfonate.

In practicing the present invention, it is preferred that some or all of the hydroxyl groups of the APG be methylated. Where methylation is preferred, the reaction is usually carried out with either methyl chloride or methyl iodide.

As noted above, the reaction is carried out at a temperature ranging from about 0 to about 50° C. and, preferably, at a temperature ranging from about 20° C. to about 30° C. at standard pressures. Thus, from the stoichiometry of the reaction, the degree of alkylation may be controlled.

In deploying or using a tosylate (p-toluenesulfonate) or other aryl sulfonate, the reaction thereof with the glucoside enables the formation of not only the surfactant, but a well known hydrotrope which can then be directly incorporated into a formulated product. This is contrasted with the conventional alkylation reaction using alkyl halides or sulfates wherein the by-product is an alkyl metal halide or alkali metal sulfate, which is an undesirable by-product.

In employing a tosylate the reaction proceeds in accordance with the following equation:

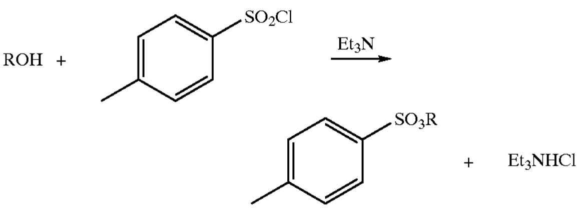

ROTs

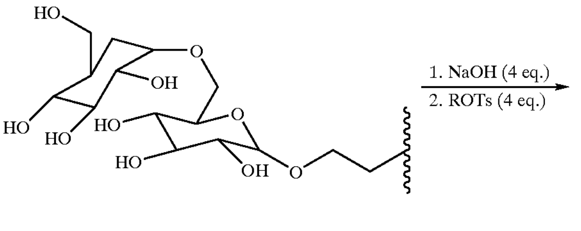

-continued

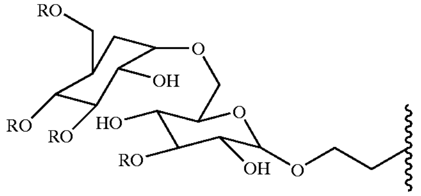

where ROH represents the alcohol for alkylating the tosylate and is, preferably lower alkyl, as defined above.

Generally, the alkylating reactant, regardless of whether it is an alkyl halide, alkyl sulfate, or aryl sulfonate, is present in a stoichiometric ratio of reactant to APG of from about 6:1 to about 1:1 depending upon the degree of alkylation desired.

As noted hereinabove, alternatively, the present nonionic surfactants may be prepared by reacting an APG with a carbonyl-containing compound, i.e. an aldehyde or ketone in accordance with the following equation:

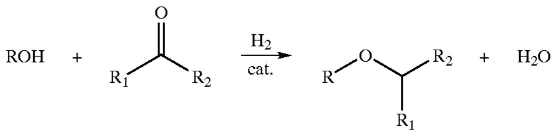

where ROH is the APG and $R_1$ and $R_2$ are each independently hydrogen or lower alkyl ranging from about $C_1$ to $C_8$ and, preferably, $C_1$ to $C_4$ and mixtures thereof. This process is more particularly detailed in U.S. Pat. No. 5,914,430, the disclosure of which is hereby incorporated by reference.

Generally, this reaction is carried out within the same temperature ranges noted hereinabove for conventional alkylation reaction.

For a more complete understanding of the present invention, reference is made to the following illustrative examples, which are not to be construed as limitative of the invention. In the examples all parts are by weight absent indications to the contrary.

EXAMPLE I

This example illustrates the preparation of a methoxylated alkyl polyglucoside in accordance with the present invention.

Into a suitable reaction vessel equipped with stirring means and heating means was charged 20 parts of a 50% wt solution of an alkyl polyglucoside dispersed and sold commercially under the name GLUCOPON 425[(1)] and 1.6 parts of a 50% aqueous NaOH solution. The mixture was stirred for about 2 hours, at room temperature. After the 2 hour period there was obtained a viscous mixture. To the mixture was added 4 parts of water to thin the mixture and to dissolve the remaining NaOH. A clear yellow solution was obtained. Then, 5.6 parts of MeI was added thereto, with stirring and stirring was continued for an additional 36 hours. The final product was a clear mixture with a theoretical 30% methoxylation, based on the stoichiometry of the reaction.

[(1)] $C_8$–$C_{1G}$ glucose-sucrose fatty alkyl glucoside sold by COGNIS.

EXAMPLE II

Following the procedure of Example I, a second methoxylated alkyl polyglucoside was prepared. However in this Example, after stirring for about twelve hours after the first MeI addition, a second charge of 3.2 parts of a 50% NaOH aqueous solution was added to the reaction vessel and stirring was continued for an additional 15 hours. Then, a second charge of 5.6 parts of MeI was added to the vessel and additional stirring was continued for about 12 hours. The final product was a clear solution of a theoretical 59% methoxylated alkyl polyglucoside.

EXAMPLE III

This example illustrates the preparation of a 98% theoretical methylated alkyl polyglucoside.

The procedure of Example II was followed, except that during the second charge of MeI 4.8 additional parts of water was added to the reaction mixture. Then, after the second stage or addition was completed, a final or third charge of 3.2 parts of a 50% NaOH solution and 5.6 parts of MeI was added. The resulting mixture was stirred for an additional 15 hours. A clear solution of a 98% theoretical methylated glucoside was obtained.

EXAMPLE IV

The performance characteristics of the products obtained in Example I—III were evaluated by investigating common important properties of low foam nonionic surfactants. The properties were measured using standard test procedures. The control studies were done with iodide added to unreacted APG to ensure the observed properties were due to the modified surfactant and not to the sodium iodide content of the surfactant solution.

Foam Profile

Foam generation was measured under static conditions at a 50 ml 0.5 wt % concentration of surfactant in tap water at 25° C. and 80° C. The foam test was conducted by shaking the solution vigorously for 20 times; allowing the shaken solution to stand for 15 seconds and, then, recording the foam volume at selected intervals. The graph of FIG. 1 shows the reduction of foam as the number of methoxyl groups is increased, at both ambient and elevated temperatures.

Surface Tension

The equilibrium surface tension of the surfactant of Example I was measured at 0.5 wt % surfactant in tap water. The following table, Table 1, shows the surface tension of the resulting surfactant.

TABLE 1

| No. of Methoxyls | Surface Tension (dyn/cm) |
|---|---|
| 0 | 28.4 |
| 2 | 28.3 |
| 4 | 28.0 |
| 6 | 28.2 |

It is noted that the surface tension of the three methoxylated surfactants remained substantially unchanged.

Cloud Point

After determining surface tension, the cloud point of the so-obtained surfactants were measured. The following table, Table 2, shows the measured cloud point. Again, 0.5 wt % solution of surfactant in tap water was used. The cloud point was observed to lower as the degree of methoxylation increased.

TABLE 2

| No. of Methoxyls | Cloud Point, ° C. |
|---|---|
| 0 | 90 |
| 2 | 90 |
| 4 | 63 |
| 6 | 55 |

EXAMPLE V

Figure 2:
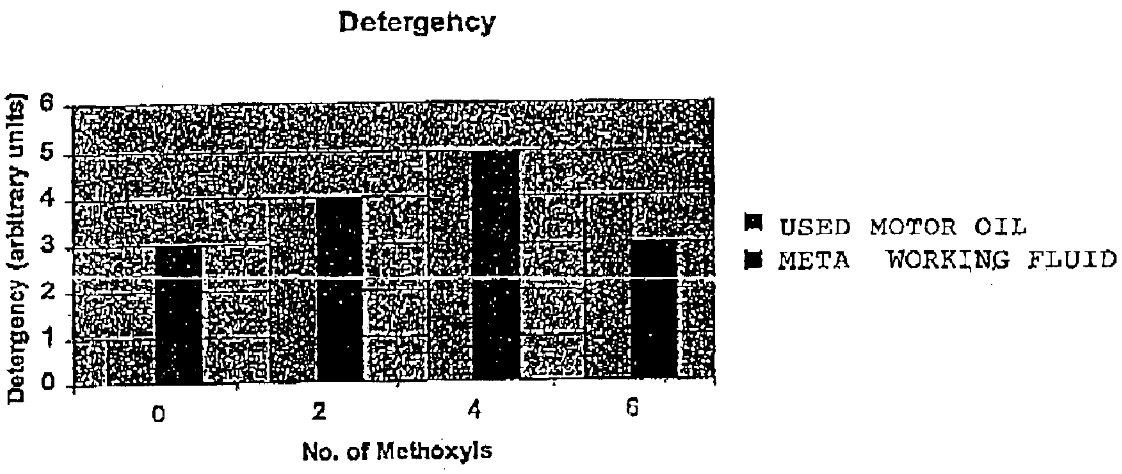
FIG. 2 is a graph showing the detergency of the present surfactants.

The surfactants prepared from Example 1 were measured for detergency. Detergency was evaluated as oil soil removal from cold rolled steel panels using a shaker method. The method, generally, involves employing a 0.5 wt % aqueous solution of surfactant which is placed in a typical shaker and to which the steel panel is exposed for five minutes at 60° C. Here, two soils were included in the evaluation. One was used motor oil and the other metalworking fluid residue. The results of this test are shown in FIG. 2. As can be seen from FIG. 2, maximum detergency is observed for an APG with four methoxyl groups. The results are consistent with what would be expected since the cloud point peaked at 60° C., and the test was conducted at 60° C. and detergency peaked at 4 methoxyl groups.

EXAMPLE VI

This example illustrates the preparation of n-butyl tosylate for use in preparing an alkylated alkyl polyglucoside therefrom.

At room temperature, in a suitable reaction vessel equipped with stirring means was charged a mixture of 7.4 parts n-butanol dissolved in 50 parts dichloromethane. Thereafter, 10.1 parts triethylamine was added to the mixture with stirring until a uniform mixture was obtained.

To the alkanol and catalyst mixture was added dropwise, with stirring, a solution of 19.0 parts p-toluenesulfonyl chloride in 50 parts dichloromethane. The reaction was mildly exothermic. After the addition was completed, stirring was continued at room temperature for about thirty minutes, at which time the mixture became cloudy and a white precipitate formed.

Stirring was continued for an additional 96 hours after which the mixture was filtered; washed three times with deionized water, dried and residual liquid evaporated.

There was recovered 11.6 parts of a yellow liquid identified as n-butyl tosylate.

EXAMPLE VII

This example illustrates the preparation of 2-propyl tosylate.

To suitable reaction vessel equipped with stirring means was added a solution of 19.0 parts p-toluenesulfonyl chloride dissolved in 50 parts dichloromethane. To this solution was added, dropwise and with stirring, a mixture of 6.0 parts 2-propanol and 10.1 parts triethylamine in 50 parts dichloromethane. Stirring was continued for an additional 96 hours, after which a white solid had precipitated out.

The reaction mixture was filtered, washed three times with 50 parts of deionized water, dried and evaporated. Twenty and four tenths parts of a yellow, fluid liquid, 2-propyl tosylate was recovered.

EXAMPLE VIII

This example illustrates the preparation of ethyl tosylate.

Into a suitable reaction vessel equipped with stirring means was added, at room temperature, 19.0 parts p-toluenesulfonyl chloride dissolved in 50 parts dichloromethane. To this was added, with stirring, dropwise, over a fifteen minute period, a solution of 4.6 parts of ethanol dissolved in 10.1 parts of triethylamine dissolved in 50 parts dichloromethane. Stirring was continued for 72 hours. After this period of time, a white precipitate formed and 4.7 parts of a yellow liquid identified as ethyl tosylate was recovered in the manner as that described with respect to Example VII.

EXAMPLE IX

This example illustrates the preparation of an n-butyl ether of an alkyl polyglucoside.

Into a reaction vessel equipped with stirring means and heating means was added 5 parts of the Glucopon 425N. The polyglucoside was diluted with 5.0 parts of distilled water. Next, 2.4 parts of a 50 wt % aqueous sodium hydroxide solution was added to the mixture and stirred to a pale yellow, clear, foamy solution.

Thereafter, 6.8 parts of the n-butyl tosylate prepared in Example VI was added thereto. The mixture was stirred overnight at room temperature. After standing for about two hours the layers separated and the mixture was stirred again to an emulsion and heated to 70° C. After four hours of stirring with heat, the bottom liquid layer was gone and was replaced with a top layer, and an emulsion. The emulsion appeared to be the butyl ether of the alkyl polyglucoside.

EXAMPLE X

The procedure of Example IX was repeated except that 6.4 parts of 2-propyl tosylate was used in lieu of the n-butyl tosylate to obtain the 2-propyl ether of the alkyl polyglucoside.

EXAMPLE XI

Following the procedure of Example IX the ethyl ether of an alkyl polyglucoside was prepared using 3 parts of ethyl tosylate which was added to the Glucopon 425N and the 50 wt % aqueous caustic solution.

With stirring, an emulsion resulted which was then stirred at room temperature for about 24 hours. After standing, the emulsion separated into two layers. Thereafter, the mixture was re-stirred to an emulsion and heated to 70° C. After four hours of heating with stirring, the bottom liquid layer had disappeared and was replaced with a top liquid layer. The reaction was then judged to be completed and heating was stopped.

EXAMPLE XII

The procedure of Example XI was repeated except that the tosylate employed was 2.3 parts of n-butyl tosylate.

After stirring for 24 hours at room temperature, there was no noticeable change in the so-formed emulsion. After standing for an additional two hours, the emulsion separated into two layers; stirring was resumed and the mixture was heated to approximately 70°. After approximately four hours, a clear solution resulted and heating was stopped.

EXAMPLE XIII

The procedure of Example XII was followed except that 1 part of ethyl tosylate was added to the polyglucoside and hydroxide mixture. After stirring for about 24 hours at room temperature, it appeared that no reaction had occurred and, thereafter, the mixture was heated, with stirring, to 70° C. and maintained thereat for five hours during which time the reaction proceeded. Thereafter, the reaction was stopped.

EXAMPLE XIV

Following the procedure of Example IX, an alkylated alkyl polyglucoside was prepared using 2.5 parts of the Glucopon 425N and 1.2 parts of 50% aqueous sodium hydroxide dissolved in 5.0 parts of distilled water and 2.3 parts of n-butyl tosylate. Upon addition of the tosylate, there was formed an emulsion which was only transiently stable. The mixture was stirred vigorously at room temperature for 24 hours and, thereafter, was heated to 70° C. and stirred vigorously for an additional 5.0 hours.

Thereafter, the reaction was complete and a pale brown liquid was recovered.

EXAMPLE XV

Following the procedure of Example X, an alkylated alkyl polyglucoside was prepared using 5 parts of Glucopon 425N dissolved in 10 parts of water and to which was added 1.6 parts of a 50% aqueous solution of sodium hydroxide, as a catalyst. To this solution was added 4.3 parts of 2-propyl tosylate, with stirring and at room temperature. With stirring an emulsion was obtained for which, after stirring at room temperature for 24 hours, no noticeable reaction had taken place. Thereafter, with stirring and at a temperature of 70° C., for 6 hours, the reaction proceeded and 20 parts of a clear brown solution was recovered.

EXAMPLE XVI

This example illustrates the foam properties of the alkylated alkyl polyglucosides hereof. The foam properties of the surfactants prepared in Examples IX, XI, XIII, and XIV were measured using a static foam test using 50 mls of a 0.3 weight % concentrate of the alkylated alkyl polyglucoside in tap water. The time was measured in minutes and the foam was measured in mls.

The following table, Table 3, shows the results therefrom.

TABLE 3

| | Foam HGT, ml @ 23° C. | | Foam HGT, ml @ 70° C. | |
|---|---|---|---|---|
| Surfactant | Min. | HGT | Min. | HGT |
| Ex. IX | 0– | 45 | 0 | 20 |
| | 1– | 42 | 1 | 20 |
| | 2– | 42 | 2 | 20 |
| | 5– | 42(1) | 5 | 18(2) |
| Ex. XI | 0 | 15 | 0 | 10 |
| | 1 | 13 | 1 | 7 |
| | 2 | 13 | 2 | 7 |
| | 5 | 13 | 5 | 6 |

TABLE 3-continued

| | Foam HGT, ml @ 23° C. | | Foam HGT, ml @ 70° C. | |
|---|---|---|---|---|
| Surfactant | Min. | HGT | Min. | HGT |
| Ex. XIII | 0 | 75 | 0 | PEG |
| | 1 | 60 | 1 | 60 |
| | 2 | 50 | 2 | 60 |
| | 5 | 50 | 5 | 48 |
| Ex. IV | 0 | 70 | | PEG |
| | 1 | 50 | | 55 |
| | 2 | 48 | | 55 |
| | 5 | 45 | | 42 |

(1)Top 15 ml very low density.
(2)Top 5 ml very low density.

As can be seen, there is provided herein a nonionic surfactant which is low foaming.

Since the surfactant hereof is polyhydric, it is contemplated that in addition to being useful in detergents, it may well have other uses including as functional fluids, in cutting oils, metalworking fluids, hydraulic fluids and the like, in the manufacture of hypoallergenic cosmetics; pesticides; fungicides; as well as a delivery system for pharmaceuticals, since these nonionic surfactants hereof are inherently non-toxic.

Also it appears that because of the polyhydric nature of these products that they may have utility in the formation of polyurethane and similar type synthetic resinous materials which are predicated upon polyhydric polyols.

It is to be readily observed from the preceding that there has been described herein a new class of petrochemical-free nonionic surfactants which are low foaming or which have the capability of being non-foaming.

Having, thus, described the invention, what is claimed is:

1. A nonionic surfactant corresponding to the formula:

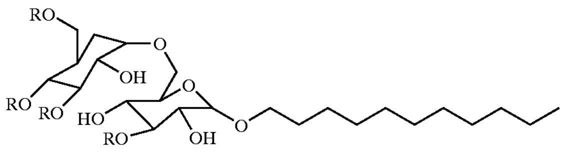

where R is lower alkyl ranging from about $C_1$ to about $C_8$, and wherein the surfactant is a petro-chemical free surfactant.

2. The surfactant of claim 1 wherein R is lower alkyl ranging from about $C_1$ to about $C_4$.

3. The surfactant of claim 1 wherein R is ethyl.

4. The surfactant of claim 1 wherein R is 2-propyl.

5. The surfactant of claim 1 wherein R is n-butyl.

6. The surfactant of claim 1 wherein R is methyl.

7. A detergent comprising:

the surfactant of claim 1.

* * * * *